US006535392B2

(12) United States Patent
Yamamoto et al.

(10) Patent No.: US 6,535,392 B2
(45) Date of Patent: Mar. 18, 2003

(54) VOLTAGE CONTROL APPARATUS FOR VEHICLE AC GENERATOR

(75) Inventors: Naoki Yamamoto, Chita-gun (JP); Makoto Taniguchi, Kariya (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/925,373

(22) Filed: Aug. 10, 2001

(65) Prior Publication Data

US 2002/0024324 A1 Feb. 28, 2002

(30) Foreign Application Priority Data

Aug. 11, 2000 (JP) .......................... 2000-243962

(51) Int. Cl.[7] .............................. H05K 7/02; H05K 5/02
(52) U.S. Cl. ......................... 361/728; 361/752
(58) Field of Search .................... 361/728, 752, 361/800, 816, 818

(56) References Cited

U.S. PATENT DOCUMENTS 5,394,011 A * 2/1995 Yamamoto et al. ......... 257/693

FOREIGN PATENT DOCUMENTS

JP          A-61-37043         2/1989

OTHER PUBLICATIONS

Texas Instruments TL 431, 431A Adjustable Precision shunt Regulators, Jul. 1978, vol. SLV005O, pp. 1–18.*

* cited by examiner

Primary Examiner—David Martin
Assistant Examiner—Dameon E. Levi
(74) Attorney, Agent, or Firm—Oliff & Berridge, PLC

(57) ABSTRACT

In a regulator (voltage control apparatus), an IC chip is adhered to the surface of a first metal plate. A lead wire connects the IC chip with an outside connecting terminal. A second metal plate formed to cover the IC chip is formed integrally with a negative side wiring for supplying a battery voltage into the IC chip.

7 Claims, 3 Drawing Sheets

VOLTAGE CONTROL APPARATUS FOR VEHICLE AC GENERATOR

CROSS REFERENCE TO RELATED APPLICATION

This application is based on and incorporates herein by reference Japanese Patent Application No. 2000-243962 filed on Aug. 11, 2000.

BACKGROUND OF THE INVENTION

1. Field of the Invention

The present invention relates to a voltage control apparatus suitable for use in a vehicle AC generator.

2. Description of Related Art

Recently, vehicle electronic device is increased and portable phone becomes popular, so that electric wave noise generated from these devices is increased in both frequency band and electric field strength. A voltage control apparatus for controlling an output voltage of a vehicle AC generator tends to be influenced by the electric wave noise.

Meanwhile, in a recent voltage control apparatus, electric power consumption of IC chips installed therein is reduced, and circuit pattern in the IC chip is fined for increasing a circuit density, so that electric current flowing through the circuit is decreased and impedance is increased. Thus, due to an electric wave noise intruding from the outside, induced voltage tends to arise in the circuit, thereby causing a malfunction of the IC chip. Further, a lead wire connecting the IC chip in the voltage control apparatus with an outside connecting terminal is fined, so that the impedance thereof is increased. Thus, due to the electric wave noise intruding from the outside, induced voltage tends to arise in the lead wire, thereby causing the malfunction of the IC chip.

For preventing the malfunction of the IC chip caused by the electric wave noise, JP-A-64-37043 discloses that entire IC chip and entire lead wire connecting the IC chip with the outside connecting terminal are covered by metal casing. Since the metal casing shields the IC chip and the lead wire from the electric wave noise intruding from the outside, circuit inside the IC chip and the lead wire extending to the outside connecting terminal are prevented from generating the induced voltage.

However, in the conventional method that the metal casing prevents an intrusion of the electric wave noise, a particular metal casing has to be prepared for shielding the electric wave noise, thereby increasing parts cost. Further, additional assembling process is necessary to attach the metal casing after wiring the IC chip and around it, thereby increasing assembling cost.

SUMMARY OF THE INVENTION

An object of the present invention is to provide a voltage control apparatus for vehicle AC generator in which an intrusion of an electric wave noise is prevented with low cost.

According to a first aspect of the present invention, an IC chip is attached to a first metal plate, and a lead wire connects the IC chip with an outside connecting terminal. A second metal plate is disposed and has a size to cover the IC chip, and the second metal plate is formed integrally with a negative side wiring for supplying a battery voltage into the IC chip. Thus, during a process of manufacturing the IC chip, an electric wave noise with respect to the IC chip is removed by only attaching the second metal plate to the outside connecting terminal. As a result, parts cost and assembling cost are reduced in comparison with that an additional metal casing is attached thereto after the IC chip is completely made. The first and second metal plates shield the IC chip from the electric wave noise intruding from the outside, so that an induced voltage caused by the electric wave noise hardly arises in a circuit within the IC chip, thereby attaining a voltage control apparatus of which electric wave noise-proof characteristic is improved.

According to a second aspect of the present invention, a position and a size of the second metal plate are set such that the IC chip is encompassed within a projected area of the second metal plate on the first metal plate. By this, the electric wave noise is prevented from intruding into the circuit within the IC chip.

According to a third aspect of the present invention, a position and a size of the second metal plate are set such that both the IC chip and the lead wire are encompassed within a projected area of the second metal plate on the first metal plate. By this, the electric wave noise-proof characteristic is further improved.

According to a fourth aspect of the present invention, the IC chip is formed in a quadrangle, and a distance between the second metal plate and the IC chip is substantially less than 1.5 times of a diagonal length of the IC chip. The induced noise caused by the electric wave noise bypasses through electrostatic capacitance arising between the IC chip or the lead wire and the second metal plate. Thus, the electric wave noise-proof characteristic is further improved.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Hereinafter, an electric voltage control apparatus for a vehicle AC generator (regulator) in the present embodiment will be explained with reference to FIGS. 1–5.

Figure 1:
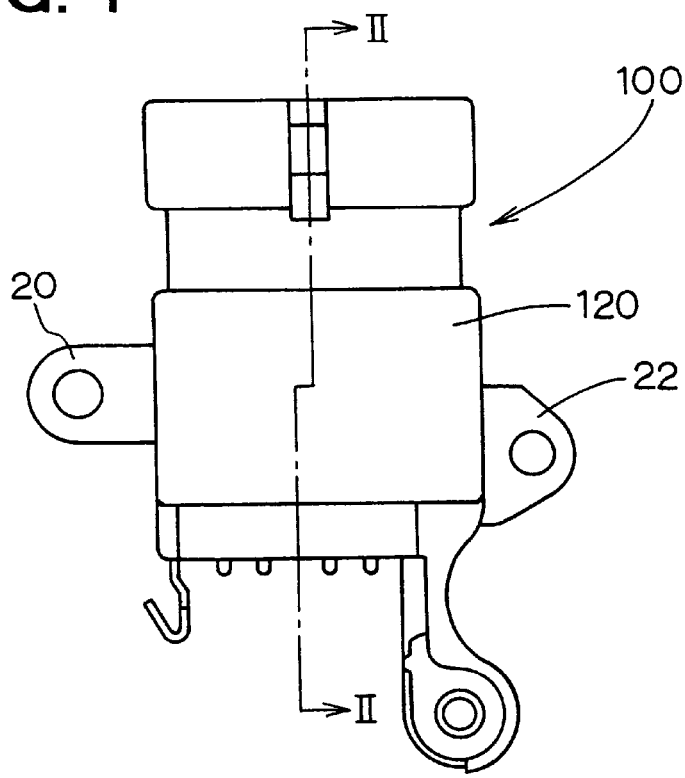
FIG. 1 is a front view showing a regulator in the present embodiment.
Figure 2:
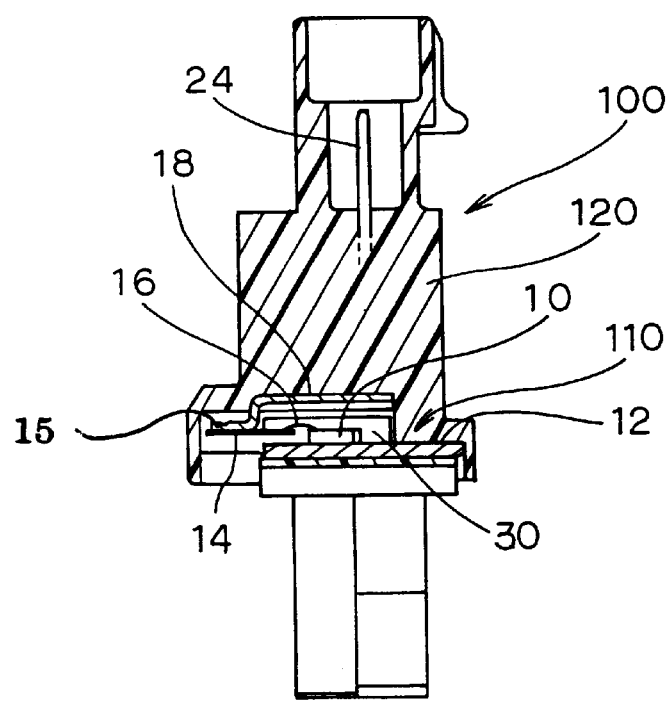
FIG. 2 is a cross-sectional view taken along line II—II in FIG. 1.
Figure 3:
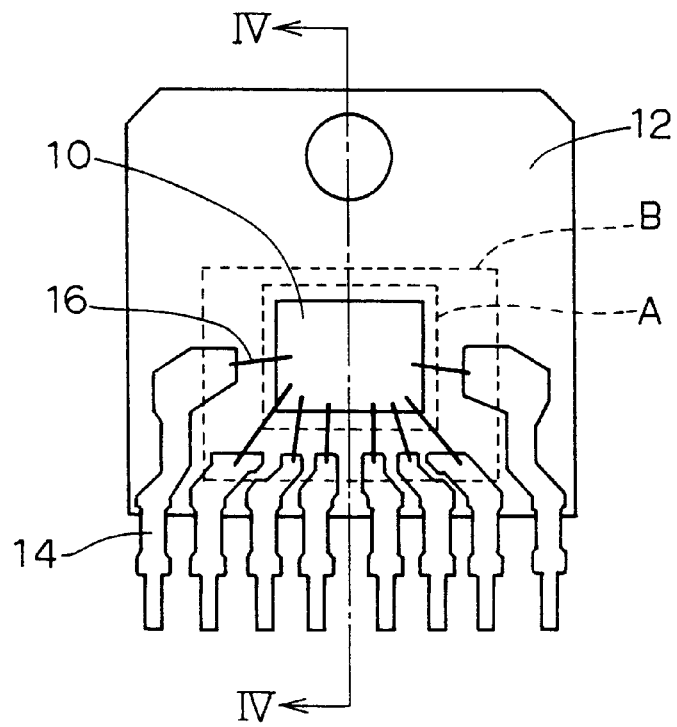
FIG. 3 is a front view showing an inside structure of the regulator.
Figure 4:
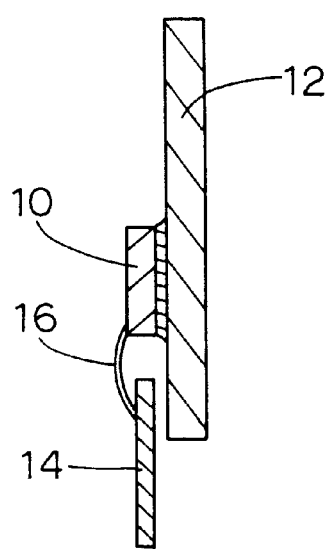
FIG. 4 is a cross-sectional view taken along line IV—IV in FIG. 3.

FIG. 1 is a front view showing a regulator 100. FIG. 2 is a cross-sectional view taken along line II—II in FIG. 1. FIG. 3 is a front view showing an inside structure of the regulator 100. FIG. 4 is a cross-sectional view taken along line IV—IV in FIG. 3.

The regulator 100 controls an output voltage of the vehicle AC generator (not illustrated), and includes a regulator body 110 and a terminal sub-assembly 120.

The regulator body 110 includes an IC chip 10, a first metal plate 12, a plurality of outside connecting terminals 14, and a lead wire 16. In the IC chip 10, electric circuits are formed for controlling the output voltage of the vehicle AC generator. The first metal plate 12 works as a radiating plate to which the IC chip 10 is adhered. The outside connecting terminals 14 are fixed to the surface of the first metal plate 12 while being electrically insulated therefrom. The lead wire 16 connects the IC chip 10 with the outside connecting terminal 14.

In the regulator body 110, the IC chip 10 adhered to the first metal plate 12 and the lead wire 16 are molded by a resin 30. The outside connecting terminals 14 are partially exposed outside the resin 30.

The regulator 100 is formed by connecting and fixing the regulator body 110 to the terminal sub-assembly 120.

The terminal sub-assembly 120 is formed by insert-forming a negative terminal 20 and a positive terminal 22 which are connected to the vehicle AC generator, and a control terminal 24 fit to a vehicle side connector (not illustrated).

The terminal sub-assembly 120 includes a second metal plate 18. When the regulator body 110 is attached to the terminal sub-assembly 120, the second metal plate 18 is disposed to face the first metal plate 12 while providing the IC chip 10 therebetween. The second metal plate 18 and the negative terminal 20 are integrally formed within a single metal plate. That is, the second metal plate 18 works as a negative side wiring to supply a battery voltage to the regulator body 110. An inside terminal 15 is formed integrally on the single metal plate connected to the outside connecting terminal 14.

Next, position and size of the second metal plate 18 will be explained.

There are two kinds of variations to set the size of the second metal plate 18 in accordance with an area for preventing an intrusion of electric wave noise. First variation is that the area is set to encompass a region A being surrounded by a dotted line A in FIG. 3, and second variation is that the area is set to encompasses a region B being surrounded by a dotted line B in FIG. 3. When the area is set to encompass the region A, the IC chip 10 is entirely encompassed within a projected area of the second metal plate 18 on the first metal plate 12. Here, the second metal plate 18 is projected toward the IC chip 10, and on the first metal plate 12. In this case, induced voltage is prevented from arising within the circuit in the IC chip 10 due to the electric wave noise intruding from the outside.

When the area is set to encompass the region B, not only the IC chip 10 but also the lead wire 16 is encompassed within the projected area of the second metal plate 18 on the first metal plate 12. In this case, induced voltage is prevented from arising within the circuit in the IC chip 10 and within the lead wire 16 due to the electric wave noise intruding from the outside.

Figure 5:
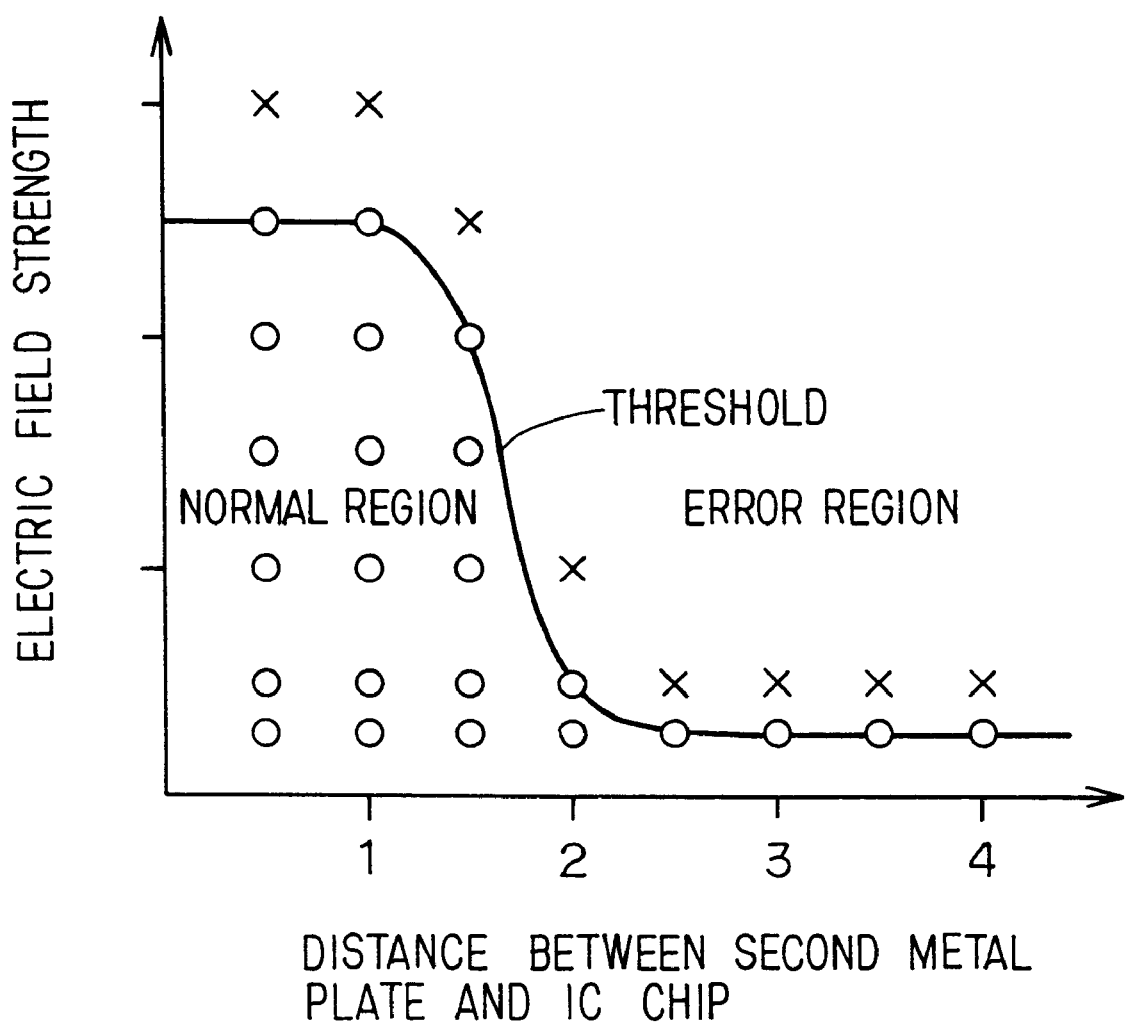
FIG. 5 is a graph showing a noise-proof characteristic relative to a distance between a second metal plate and an IC chip.

FIG. 5 is a graph showing a noise-proof characteristic relative to a distance between the second metal plate 18 and the IC chip 10. Latitudinal axis indicates the distance between the second metal plate 18 and the IC chip 10, and plots values normalized when the diagonal length of the IC chip 10 is normalized as 1. Longitudinal axis indicates electric field strength. FIG. 5 shows test results that are tested whether the IC chip 10 appropriately operates or not while changing a combination of the electric field strength and the distance between the second metal plate 18 and the IC chip 10. In FIG. 5, circles "○" denote that the IC chip 10 appropriately operated, and "X" denote that the IC chip 10 did not appropriately operate and malfunctioned. Here, the test was conducted by using the second metal plate 18 having a size including the region B in FIG. 3.

As is understood from FIG. 5, when the distance between the second metal plate 18 and the IC chip 10 is set to less than 1.5 times of the diagonal length of the IC chip 10, the malfunction of the IC chip 10 is mostly prevented, thereby attaining an improved an electric wave noise-proof characteristic.

As described above, in the regulator 100 in the present embodiment, when the IC chip 10 is adhered to the first metal plate 12, the second metal plate 18 is disposed within the terminal sub-assembly 120 to cover at least the entire IC chip 10. The second metal plate 18 is integrally formed with the negative terminal 20 and is used. Thus, for example, when the size and position of the second metal plate 18 are set to cover only the IC chip 10, the intrusion of the electric wave noise from the outside into the IC chip 10 is shut, thereby preventing the IC chip 10 from malfunctioning due to the unnecessary induced voltage caused by the electric wave noise. When the size and position of the second metal plate 18 are set to cover the region including not only the IC chip 10 but also the lead wire 16, which extends toward the outside connecting terminals 14 around the IC chip 10, intrusion of the electric wave noise from the outside to the IC chip 10 and the lead wire 16 is shut. Thus, The IC chip 10 is prevented from malfunctioning due to not only the induced voltage arising in the IC chip 10 but also the induced voltage arising within the lead wire 16. As a result, the electric wave noise-proof characteristic is improved.

Especially, as shown in FIG. 5, when the distance between the second metal plate 18 and the IC chip 10 is set to less than 1.5 times of the diagonal length of the IC chip 10, the induced voltage caused by the electric wave noise bypasses through electrostatic capacitance arising between the IC chip 10 or the lead wire 16 and the second metal plate 18. Thus, the malfunction of the IC chip 10 is prevented with certainty.

Further, in the regulator 100 in the present embodiment, since the second metal plate 18 is integrally formed with the negative terminal 20, they can be molded simultaneously when the terminal sub-assembly 120 is formed. Thus, in comparison with the case that additional metal case is assembled after molding, number of parts is reduced and assembling process is simplified, thereby reducing cost for parts and assembling.

Modifications

According to the above-described embodiment, the second metal plate 18 covers the entire IC chip 10 (region "A" in FIG. 3), or the second plate. 18 covers the entire IC chip 10 and lead wire 16 (region "B" in FIG. 3). Alternatively, the second metal plate 18 may cover further broader region, as long as the second metal plate 18 covers these regions "A" or "B". The second metal plate 18 may cover the IC chip 10 and a part of the lead wire 16, if necessary. For example, the second metal plate 18 may cover selectively only a long lead wire 16 which tends to arise the induced voltage caused by the electric wave noise.

What is claimed is:

1. A voltage control apparatus for vehicle AC generator, comprising:
   an IC chip including a circuit for controlling an output voltage of the vehicle AC generator;
   a first metal plate to which said IC chip is attached;
   an outside connecting terminal for said IC chip;
   a lead wire for connecting said IC chip with said outside connecting terminal; and a negative side wiring for supplying a battery power to said IC chip, wherein said negative side wiring is provided with a single metal plate which is integrally formed with a negative terminal to be connected to a negative side of said battery and an inside terminal connected with said outside connecting terminal, the single metal plate further having a second metal plate formed integrally, and said second metal plate is disposed and has a size such that said second metal plate covers said IC chip on said first metal plate.

2. A voltage control apparatus according to claim 1, wherein said IC chip is encompassed within a projected area of said second metal plate on said first metal plate.

3. A voltage control apparatus according to claim 1, wherein said IC chip and said lead wire are encompassed within a projected area of said second metal plate on said first metal plate.

4. A voltage control apparatus according to claim 1, wherein said IC chip is formed in a quadrangle, and a distance between said second metal plate and said IC chip is substantially less than 1.5 times of a diagonal length of said IC chip.

5. A voltage control apparatus according to claim 1, wherein said IC chip, said first metal plate, said outside connecting terminal and said lead wire are assembled as a regular body.

6. A voltage control apparatus according to claim 5, wherein said negative side wiring is formed in a terminal sub-assembly which is connected with said regulator body, said terminal sub-assembly supporting said negative terminal in an exposed manner and supporting the second metal plate so that the second plate is placed in parallel to the first metal plate when the regulator body is assembled with the terminal sub-assembly.

7. A voltage control apparatus according to claim 6, wherein said IC chip, said first metal plate, said outside connecting terminal and said lead wire are covered with a resin.

\* \* \* \* \*